United States Patent
Zhou

(10) Patent No.: US 7,907,482 B2
(45) Date of Patent: Mar. 15, 2011

(54) METHOD AND SYSTEM FOR CORRECTION OF ERRORS

(75) Inventor: Yu Zhou, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 518 days.

(21) Appl. No.: 11/995,546

(22) PCT Filed: Jul. 6, 2006

(86) PCT No.: PCT/IB2006/052287
§ 371 (c)(1),
(2), (4) Date: Jan. 14, 2008

(87) PCT Pub. No.: WO2007/010426
PCT Pub. Date: Jan. 25, 2007

(65) Prior Publication Data
US 2008/0279059 A1  Nov. 13, 2008

(30) Foreign Application Priority Data
Jul. 15, 2005 (EP) .................................... 05106502

(51) Int. Cl.
*G11B 7/00* (2006.01)
(52) U.S. Cl. ................ 369/44.32; 369/53.14; 369/53.18
(58) Field of Classification Search ............... 369/53.18, 369/53.14
See application file for complete search history.

(56) References Cited

U.S. PATENT DOCUMENTS

| 5,023,857 | A |   | 6/1991 | Verboom |
| 5,502,698 | A | * | 3/1996 | Mochizuki ................ 369/44.32 |
| 6,147,944 | A |   | 11/2000 | Kwon et al. |
| 6,166,875 | A |   | 12/2000 | Ueno et al. |
| 2003/0016607 | A1 | * | 1/2003 | Cho et al. .................... 369/47.42 |
| 2003/0086342 | A1 |   | 5/2003 | Han et al. |
| 2004/0030416 | A1 | * | 2/2004 | Erickson et al. ............... 700/28 |
| 2004/0037193 | A1 |   | 2/2004 | Andersen et al. |
| 2005/0018557 | A1 | * | 1/2005 | Kim ........................... 369/44.34 |

FOREIGN PATENT DOCUMENTS

| EP | 0332689 | 9/1989 |
| JP | 11-025477 | 1/1999 |
| JP | 2002-312965 | 10/2002 |
| JP | 2003-030875 | 1/2003 |
| WO | 0133561 A1 | 5/2001 |

OTHER PUBLICATIONS

ISR/written Opinion of the International Searching Authority PCT/IB2006β52287.

* cited by examiner

*Primary Examiner* — Lixi Chow

(57) ABSTRACT

A method and system for removing periodic disturbances pertaining to turntable and spindle motor errors during recording of a blank optical information carrier. The periodic disturbances are determined in advance and removed only during recording by a repetitive control/learning feedforward control circuit (88).

13 Claims, 3 Drawing Sheets

METHOD AND SYSTEM FOR CORRECTION OF ERRORS

The present invention relates to a method and system for correction of trackrelated errors of an optical information carrier to be recorded, such as eccentricities or track unroundness, during recording on the optical information carrier, such as an optical disk.

An optical information carrier, such as an optical disk, is handled by an apparatus for recording new information on and reproducing information previously recorded on the optical information carrier.

The apparatus comprises means for retaining the disk to a shaft of the apparatus to be rotated by a motor driving the shaft. An optical pick-up unit (OPU) is arranged to sense optical markings of the disk and comprises a radiation source such as a laser, directing the radiation towards the disk. The radiation obtained from the disk is evaluated and the optical information is gathered.

The optical information carrier may be a CD or a DVD or a magneto-optical disk or any other similar medium. The apparatus for recording and playing may be a CD/DVD recorder/player. The information may be comprised in tracks of the carrier, which tracks may be oriented in a spiral pattern or in multiple concentric paths.

Such an apparatus comprises a disk holder for retaining the disk to a shaft or spindle of a drive motor. All such mechanical devices have imperfections, such as a small deviation between the centrum of the disk holder and the rotation axis, causing eccentricity and/or wobbling when the disk is rotated. The spindle may itself have small deviations from the rotation axis. The motor driving the spindle may cause small deviations from the rotation axis, such as because of imperfections of the bearings or as a result of different coils being activated during the rotation, etc. All such imperfections of the drive and the disk holder result in disturbances of the operation of the disk drive. Such disturbances are normally related to the rotational speed of the disk drive or any harmonics thereof and will be called periodic disturbances below.

The drive may comprise means for suppressing such periodic disturbances, such as servo systems for the OPU to follow the tracks of the disk. If the errors are within specified limits, the servo systems are able to take care of such imperfections.

When a blank disk is to be recorded, the blank disk is in advance provided with pregrooved track information, such as a faint pre-groove following the shape of a spiral, so that the OPU is able to follow such tracks during the recording operation.

During such pretreatment of a blank disk, the tracks may obtain eccentricity or unroundness errors as well. When the recording apparatus records or writes information to such tracks, further periodic disturbances may be added arising from the recording apparatus.

Finally, when the recorded disk is to be replayed by a player, periodic disturbances arising from the player may be added. If all such disturbances act in the same direction, there is a risk that the errors will accumulate and result in that the disk will be impossible to play.

Attempts to remedy such problems have been made, for example in WO 01/33561, which discloses a device for reproducing and/or recording information on a rotating information carrier. The device comprises periodic disturbance correction means for generating a compensation signal for a periodic component in a control signal for the setting of the device.

This previously known document deals with only a portion of the problem. However, when a blank disk is recorded, the device according to said document does not provide a solution to periodic disturbances.

An object of the invention is to provide a method and system for correction of errors of an optical information carrier to be recorded, such as eccentricities or track unroundness, during recording on the optical information carrier.

In a first aspect, there is provided a method for correction of trackrelated errors of an optical information carrier during recording by a recorder, comprising an optical pick-up unit controlled by a servo system arranged to follow tracks prerecorded in said carrier. The method comprises: retrieving information pertaining to periodic disturbances relating to the recorder, from a memory of the recorder; and adding said information to a feedforward track control system of said servo system to correct for said periodic disturbances during recording. The periodic disturbances relating to the recorder may be turntable and spindle motor errors.

In an embodiment, the method further comprises: suppressing only information pertaining to said periodic disturbances coming from turntable and spindle motor during recording by a repetitive control/learning feedforward control circuit. The method may further comprise: obtaining a rotation signal representative of a rotation speed of the information carrier; feeding said rotation signal to a correction circuit for calculation of suppressing information; and feeding said suppressing information to said repetitive control/learning feedforward control circuit to calculate a suppressing signal to be added to a servo control signal for controlling said servo system.

In another embodiment, the information pertaining to periodic disturbances relating to the recorder may be obtained by the following steps: playing an information carrier without periodic disturbances; obtaining a signal related to said periodic disturbances according to the following equation:

$$Y_1(k) = \sum_{i=1}^{N} A_{1i}\sin(\omega_i kT + \theta_{1i}) \quad (1)$$

where $Y_1$ refers to the radial/focus error signal induced by the periodic disturbances of the recorder, $\omega_i = i\omega_0$ is the disc rotation frequency, $A_{1i}$ is the amplitude of the disturbances at i:th harmonic of rotation frequency and $\theta_{1i}$ is the phase of the motor disturbance at i:th harmonic of rotation frequency, and T is the sampling time and k is a real number; and taking the FFT transform of equation (1) in order to obtain the amplitudes $A_{1i}$ and the phases $\theta_{1i}$.

In another aspect, there is provided a system for correction of trackrelated errors of an optical information carrier during recording by a recorder, comprising an optical pick-up unit controlled by a servo system arranged to follow tracks prerecorded in said carrier. The system comprises: a memory comprising information pertaining to periodic disturbances relating to the recorder; and a feedforward track control system of said servo system to correct for such periodic disturbances during recording. The periodic disturbances relating to the recorder may be turntable and spindle motor errors.

In an embodiment, the system further comprises: a repetitive control/learning feedforward control circuit for suppressing only information pertaining to said periodic disturbances coming from turntable and spindle motor during recording. The system may further comprise: a sensor for obtaining a rotation signal representative of a rotation speed of the information carrier; a correction circuit for calculation of suppressing information based on said rotation signal; said control/learning feedforward control circuit being arranged to calculate a suppressing signal to be added to a servo control signal for controlling said servo system based on said suppressing information.

Further objects, features and advantages will appear from the following detailed description of embodiments of the invention with reference to the appended drawings, in which.

Figure 1:
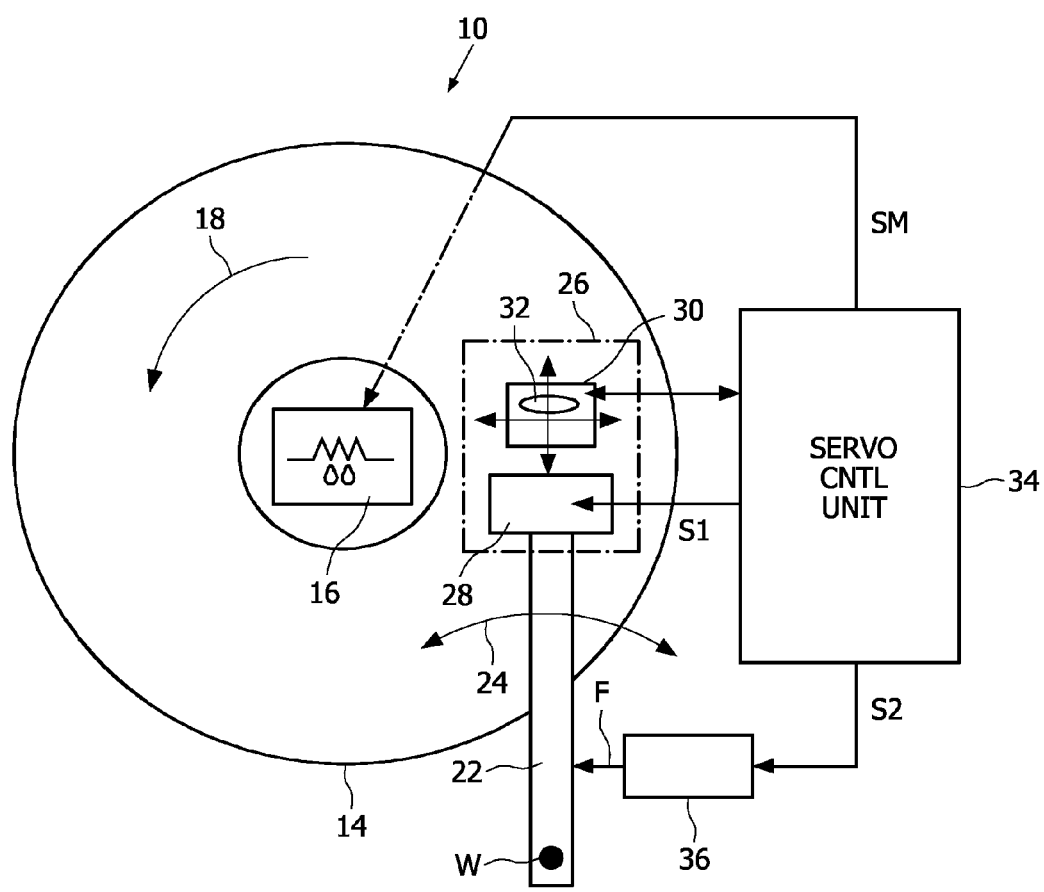
FIG. 1 is a schematic block diagram of a previously known disk recorder/player.

A disk drive in which the invention may be embodied is shown in FIG. 1.

FIG. 1 discloses a reading and/or writing device generally indicated by 10 for reading an optical information carrier, such as a CD and/or a DVD disk. The device 10 is operable to read pixel date from and/or write pixel data to an associated carrier 14. The carrier comprises rows of pixels arranged on circular tracks, which are generally arranged in a spiral pattern or in concentric circles.

The device 10 includes a drive motor 16 for rotating the carrier 14 about its central axis in a direction indicated by an arrow 18. The device 10 further includes an elongate arm 22 pivotally mounted at its first end about an axis W so as to be capable of rotating its second end in a substantially radial direction relative to the carrier 14 as indicated by an arrow 24.

At the second end of the arm 22 remote from the axis W, there is provided an optical sensor arrangement shown included within a dotted line 26. The sensor arrangement includes an actuator assembly 28 mechanically coupled to the second end of the arm 22 and also coupled to an optical pickup assembly 30 so as to be capable of precision actuating the pickup assembly 30 relative to the second end of the arm 22. The pickup assembly 30 includes optical components denoted by 32, for example one or more lenses, one or more lasers and one or more photodetectors. The device 10 further includes a servo control unit 34 for: receiving a pickup signal from the pickup assembly 30; for outputting a write signal thereto; for outputting a first position control drive signal S1 to the actuator assembly 28; for outputting a second position control drive signal S2 to a arm motor 36 for creating an actuating force F; and for outputting a drive signal SM to the motor 16 to control its speed of rotation. The signal S1 essentially comprises at least a radial actuator signal for controlling the radial position of the lenses perpendicular to the tracks and a focus actuator signal for maintaining the lenses in focus on a track of the carrier.

In operation, the arm motor 36 is responsible for coarsely moving the sensor arrangement in a transverse direction, essentially along a radius of the carrier 14 to arrange the pickup assembly opposite a selected track of the carrier. Moreover, the actuator assembly 28 is operable to finely move the pickup assembly 30 to ensure accurate tracking to rows of pixels on the carrier 14. The pickup assembly 30 is operable to generate a finely focused spot of optical radiation for interrogating the carrier 14 and/or for writing data thereon.

The embodiment described below relates to a method and a system for correcting blank disc eccentricity or track unroundness during recording or writing in a CD/DVD recorder. By using this system, it is possible to correct for eccentricity and/or track unroundness of the recordable/rewritable disc, which for example are inherent from disc manufacturing.

The system reduces errors caused by periodic disturbances, which means that limit requirements on blank discs with regard to eccentricity and track unroundness can be reduced on one hand, and also at the same time improve the recording quality of CD/DVD recorders.

In CD/DVD recorders and players, disc disturbances like disc eccentricity and local distortion in track roundness may be coupled to the rotation frequency of the spindle motor. This disturbance together with the disturbances generated by the turntable eccentricity, spindle motor wobble etc. form periodic disturbances of disc rotation frequency in optical disc drives.

The disk drives may comprise servo control system, wherein a kind of repetitive control systems are used to create a high gain locally around the rotation dependent harmonic frequencies to suppress these periodic disturbances. It actually lets the laser spot follow these periodic disturbances so that the radial and/or focus error signal is kept low enough to maintain a good tracking performance. For playback, this is normally good enough to achieve a good tracking and thus better signal quality.

For recording, however, the previously known method will inherit the eccentricity and track unroundness of the disk for the written signal. For example, if the blank disc's pregrooved wobble track information is eccentrically distorted, the laser spot will also track and follow this disc eccentricity during the recording. Then, the written disc will also be eccentrically distorted. When this disc is arranged into another device or drive, which does not have a good periodic disturbance suppression controller or in which the drive's turntable or motor has everything at the high side, the playback of this written signal may have a problem. In order to overcome this problem, a new system is disclosed to write/record the disc without eccentricity or track unroundness even on the eccentrically distorted or local track distorted blank recordable/rewritable discs.

Figure 2:
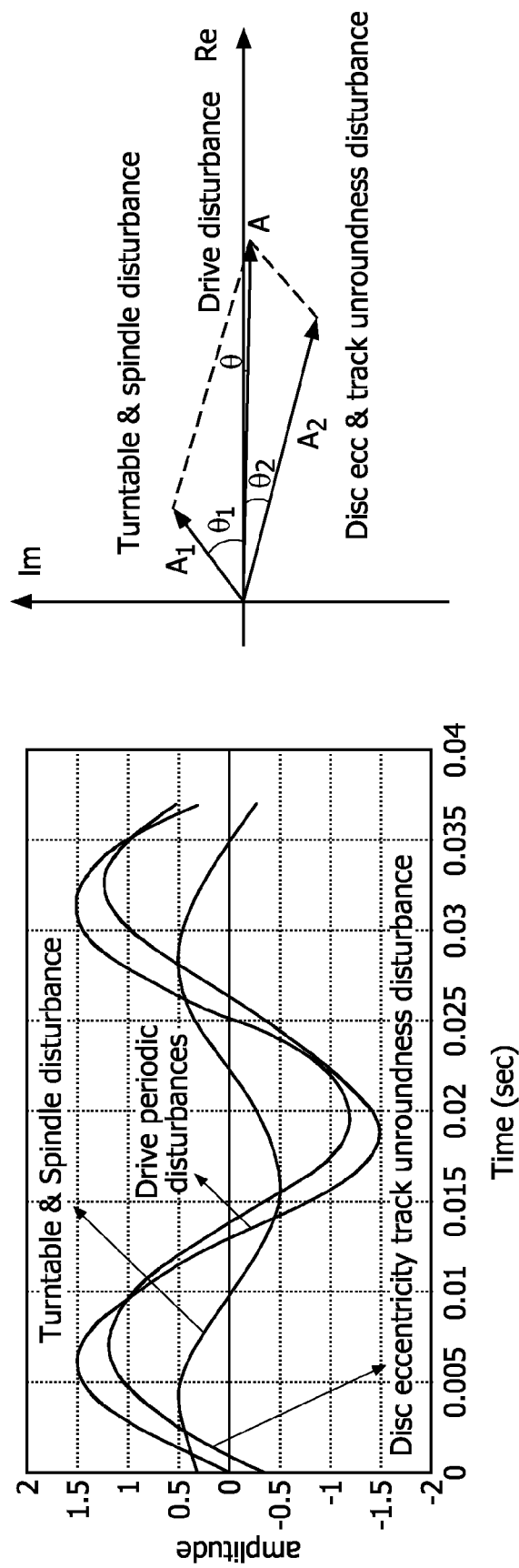
FIG. 2 is a schematic diagram showing curves of the periodic disturbances.

The drive periodic disturbances mainly comes from two parts:
1. turntable and spindle motor
2. Disc FIG. 2 shows the error signal result from turntable and spindle motor disturbance and disc disturbances, respectively.

During recording, the actuators should not follow the disturbances caused by the disc eccentricity and track unroundness so that it is possible to correct the disc eccentricity and track unroundness error that was made in the disc manufacturing. At the same time, the disturbances caused by the turntable and spindle motor should not be reflected on the recorded signal. So during recording/writing, it is desired to suppress the disturbances coming from turntable and spindle motor, and at the same time, to prevent the actuator from following the disturbances caused by the disc eccentricity and track unroundness. This is what is called here for disc eccentricity and track unroundness correction recording/writing.

Below, an embodiment of the method and system for implementing the above idea for disc eccentricity and track unroundness correction recording/writing is described.

Considering the practical implementation, a discrete-time representation of the signals and the system is given. For the turntable and spindle motor disturbances, its influence on the radial and focus error at its fundamental and N harmonic frequencies can be described by the following equation:

$$Y_1(k) = \sum_{i=1}^{N} A_{1i} \sin(\omega_i kT + \theta_{1i}) \quad (1)$$

Where $Y_1$ refers to the radial/focus error signal induced by the disturbances of turntable and spindle motor, $\omega_i = i\omega_0$ is the disc rotation frequency, $A_{1i}$ is the amplitude of the disturbances at the i:th harmonic of rotation frequency and $\theta_{1i}$ is the phase of the motor disturbance at the i:th harmonic of rotation frequency, and T is the sampling time, k=1, 2, 3, . . . N (i=1 corresponds with the rotation frequency).

These characteristics of this disturbance $(A_{1i}, \theta_{1i})$ (i=1, . . . , N) coming from the turntable and spindle motor disturbance may be measured in the production line by using a standard DVD-SL (DVD single layer) disc without eccentricity and track unroundness. The measured values will then be stored in the drive—OPU EEPROM. This measurement step is called turntable motor calibration. Alternatively, or in addition, the turntable motor calibration may take place at any suitable time, such as each day, each week or each month, or whenever a user initiates such calibration.

Figure 3:
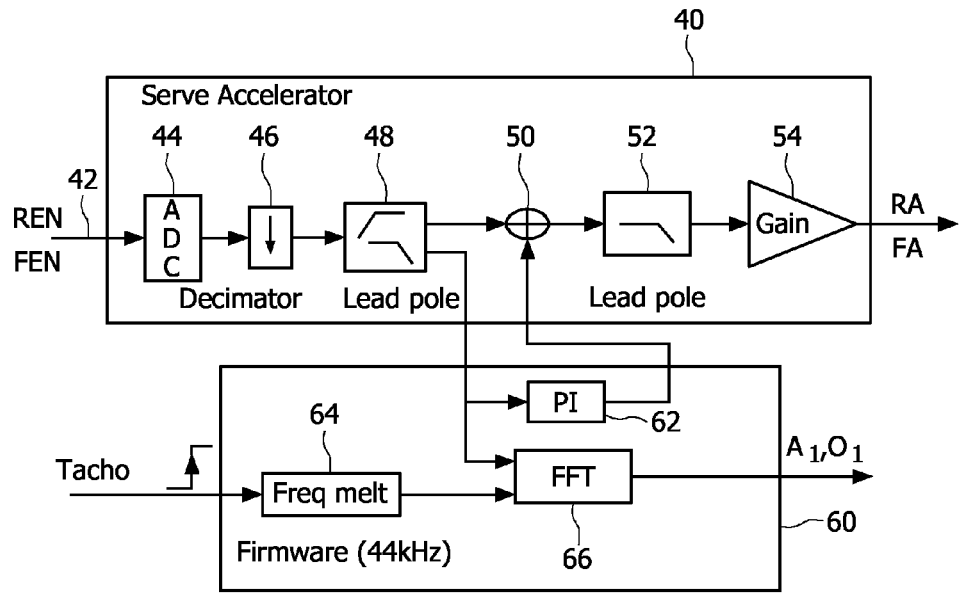
FIG. 3 is a schematic block diagram showing how to obtain parameters valid for the disk recorder/player.

FIG. 3 shows the measurement block for the calibration in the system. The system comprises a servo accelerator 40 and a servo processor 60. Block 40 is a fast servo processor which is implemented in hardware and clocked at the frequency of 16.9 MHz. It has a normalized input signal REN/FEN 42 which is received by block ADC 44, which is a 1 bit sigma delta convertor, sampling at a frequency of 8.48Mhz. The use of large sample frequency is to reduce the phase shift caused by the sampling process in the signal spectrum.

The signal from block ADC is coupled to a decimator block 46. It performs two actions: filtering and decimation. The filter is running at the 8.48 MHz sample frequency. The transfer function is $1+2z^{-1}+z^{-2}$. A 1 bit input stream results in 3 bits word having values between 000 and 100. From a 3 bits word half of the range is used, giving a scalefactor which is 0.5. After the filtering the decimator lowers the sample rate to 4.24 MHz.

The signal from block 46 is then coupled to a first lead pole filter 48 having a high pass and a low pass filter portion. A high pass first filter signal is coupled to an adder 50 and further on to a second lead pole filter 52 (low pass filter or noise filter) and finally to a gain amplifier 54 for driving the radial/focus actuator 28.

A signal from a second output of the first lead pole filter 48 is coupled to a PI processor 62 arranged in a servo processor block 60 operating at 44 kHz and implemented by DSP firmware. The output signal from the PI processor is added to the first filter signal from the first lead pole filter in said adder 50. The PI processor 62 performs a feedforward operation, so that the radial/focus error signal may be minimized.

In the firmware/servo processor block 60, a tacho signal corresponding to the rotational speed of the motor shaft is received by a frequency multiplier 64 to multiply the signal by a constant, such that 64 pulses per revolution is generated to synchronize the spindle motor speed. REN/FEN signal taken from the second output of the first lead pole filter (lowpass filter) 48 is coupled to a FFT block 66 (Fast Fourier Transform). The upsampled frequency signal is also coupled to the FFT block 66, whereupon the FFT block calculates the amplitude signals $A_{1i}$ and phases $\theta_{1i}$. These constants are then stored in a memory of the disk drive. These constants may be used as described below.

The calibration may be conducted in the production line EOD (End of Drive) station. The measurement of the radial and focus error signal is synchronized to the spindle motor/disc rotation frequency by the signal coming from a spindle motor Hall-sensor—called tacho motor signal. This tacho signal is fed to a frequency multiplier in Centarus to generate 64 sample pulses (equally spaced in time with a resolution of DSP processing clock period of the Centarus) over each revolution. Then the sampling frequency is given by $f_s=64*2\pi\omega_i$, where $\omega_i$ is the rotation frequency and its harmonics. Centarus is a Core processor IC used for DVD+R(W) products. It is a single chip CD/DVD decoder/encoder, servo processor and MIPs for use in high-speed DVD+R(W) and CD-R(W) recorders. It contains: CD/DVD channel decoder/encoder; buffer manger; Multimedia block with integration audio DAC; Servo controller based R.E.A.L digital servo processor; microcontroller based on MIPs core; OPC and laser control functions; CSS etc.

If the FFT transfer of the sampled error signal is obtained, the characteristics of the turntable disturbances can be obtained as:

$$A_{1i} = \frac{\sqrt{\text{Re}^2(x(j\omega_i)) + \text{Im}^2(x(j\omega_i))}}{M/2}; \quad (2)$$

$$\theta_{1i} = \tan^{-1}\left(\frac{\text{Im}(x(j\omega_i))}{\text{Re}(x(j\omega_i))}\right)$$

where $$x(j\omega_i) = DFT(Y(k)) = \sum_{k=0}^{M-1} Y(k) \times e^{-j\frac{2\pi i}{M}}$$

and i is the i:th harmonics.

Where M is the total number of sampling point in one revolution.

This amplitude and phase information will be the characteristics of the turntable and spindle motor, and will be stored in the OPU EEPROM for later use. Since the first 8 harmonics are usually the most significant disturbances that will affect the drive tracking performance, N may be set to 8 and the first 8 harmonics characteristics of the disturbances are measured and calculated. In order to get accurate measurement results, 64*32 samples are sampled and used for the calculation.

It is possible to make several consecutive measurements and take the average of such several measurements, in order to counteract calculation errors.

During playback or recording, the disc eccentricity and track unroundness will introduce additional periodic disturbances of rotation frequency. It can be described as:

$$Y_2(k) = \sum_{i=1}^{N} A_{2i} \sin(\omega_i kT + \theta_{2i}) \quad (3)$$

Where $Y_2$ refers to the radial/focus error signal induced by the disturbances of disc eccentricity and track unroundness, $\omega_i = i\omega_0$ is the disc rotation frequency, $A_{2i}$ is the amplitude of the disturbances at the i:th harmonic of rotation frequency and $\theta_{2i}$ is the phase of the motor disturbance at the i:th harmonic of rotation frequency, and T is the sampling time, N is the number of harmonic modes.

As shown in FIG. 2, this disturbances will be coupled to the disturbances of turntable and spindle motor. The periodic disturbances in the drive during playback and recording is the combined disturbances from both turntable motor (1) and disc (3) and can be then described by the equation:

$$Y(k) = \sum_{i=1}^{N} A_i \sin(\omega t + \theta_i) = \qquad (4)$$

$$= \sum_{i=1}^{N} A_{1i} \sin(\omega t + \theta_{1i}) + \sum_{i=1}^{N} A_{2i} \sin(\omega t + \theta_{2i})$$

Where Y refers to the radial/focus error signal induced by the disturbances of both turntable and spindle motor and disc eccentricity and track unroundness, $A_i$ is the amplitude of the disturbances at the i:th harmonic of rotation frequency and $\theta_i$ is the phase of the motor disturbance at the i:th harmonic of rotation frequency.

For playback, this sampled radial/focus error signal is fed to a repetitive/learning feedforward control of the drive so that the controller may learn the control signal to suppress these periodic disturbances. In this way, the actuator will be able to follow the turntable motor and disc eccentricity and track unroundness to get the better read out of the signal that is written in the unround tracks. For more information, please refer to WO 01/33561.

But for recording, if we still control the actuator in the same way as in playback. The actuator will follow the original disc eccentricity and track unroundness that is pregrooved in the disc, resulting in a recorded disc with eccentricity and uncorrected track unroundness. In order to overcome the blank disc eccentricity and track unroundness, a new servo control system is proposed here for recording/writing, so that the disc eccentricity and track unroundness will be corrected during recording/writing.

Figure 4:
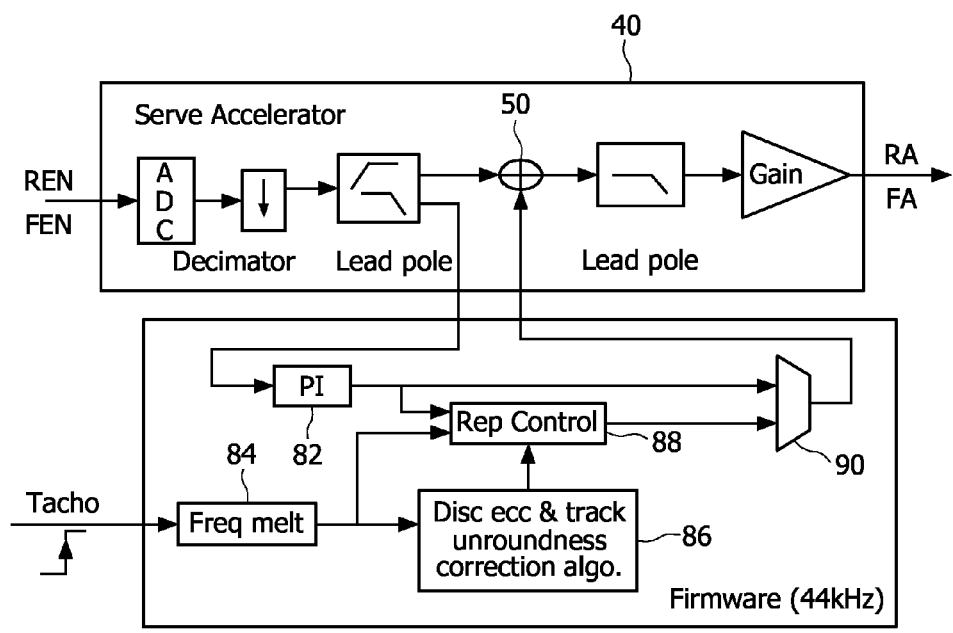
FIG. 4 is a schematic block diagram showing how to use the parameters for the purpose of an embodiment of the invention.

According to an embodiment of the method, the following steps are taken: retrieve the calibrated characteristics of the turntable and spindle motor from the EEPROM and let the repetitive control/learning feedforward control suppress only these disturbances coming from turntable and spindle motor during recording/writing. FIG. 4 shows the implementation blocks of the algorithm.

FIG. 4 discloses the firmware including an embodiment of the invention. The Servo Accelerator 40 is the same as described in FIG. 3. However, the firmware 80 of FIG. 4 is different from firmware 60 in FIG. 3. The tacho signal is connected to a frequency multiplier 84 and the upsampled tacho signal is coupled to a disc eccentricity and track unroundness correction circuit 86, which comprises the constants $A_{1i}$ and $\theta_{1i}$ obtained with the operation of the circuit of FIG. 3. The correction circuit 86 calculates suppressing information, which is coupled to a repetitive control/learning feedforward control circuit 88. The feedforward control circuit 88 also receives as input signals the upsampled tacho signal and the output from the PI processor 82 similar to the PI processor 62 of FIG. 3. The feedforward control circuit 88 calculates a suppression signal to be added to (or subtracted from) the signal from the PI processor 82 in adder block 90, the output signal of which being coupled to adder 50. In this way, the correction circuit 86 and the feedforward control circuit 88 removes or compensates for periodic disturbances arising from the turntable and spindle of the actual drive during recording.

The invention can be implemented in any suitable form including hardware, software, firmware or any combination of these. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

Above, the invention has been described in relation to certain embodiments shown on the drawings. However, such embodiments do not limit the invention but are only for illustrating the invention. The invention may be modified and completed in different manners as occurs to a skilled person reading the specification and such modifications are intended to be within the scope of the invention. The invention is only limited by the appended patent claims.

The invention claimed is:

1. A method for correction of track related errors of an optical information carrier (14) during recording by a recorder, comprising an optical pick-up unit (30) controlled by a servo system (34) arranged to follow tracks prerecorded in said carrier, the method characterized in:
    retrieving an amplitude and phase of a motor disturbance at an i:th harmonic of rotation frequency, where i=1...N, pertaining to periodic disturbances associated with the rotational speed of a drive mechanism or any harmonics thereof relating to the recorder, from a memory of the recorder; and
    adding said amplitude and phase of a motor disturbance at an i:th harmonic of rotation frequency, to a repetitive control/learning feedforward control circuit (88) of said servo system (34) to correct for said periodic disturbances during recording.

2. The method of claim 1, wherein said periodic disturbances relating to the recorder are turntable and spindle motor errors.

3. The method of claim 2, further comprising:
    suppressing only information pertaining to said periodic disturbances coming from turntable and spindle motor during recording by said repetitive control/learning feedforward control circuit (88).

4. The method of claim 3, further comprising:
    obtaining a rotation signal representative of a rotation speed of the information carrier (14);
    feeding said rotation signal to a correction circuit (86) for calculation of suppressing information;
    feeding said suppressing information to said repetitive control/learning feedforward control circuit (88) to calculate a suppressing signal to be added to a servo control signal for controlling said servo system (34).

5. The method of claim 1, wherein said information pertaining to periodic disturbances relating to the recorder is obtained by the following steps:
    playing an information carrier (14) without carrier periodic disturbances;
    obtaining a signal related to said periodic disturbances according to the following equation:

$$Y_1(k) = \sum_{i=1}^{N} A_{1i}\sin(\omega_i kT + \theta_{1i}) \quad (1)$$

where $Y_1$ refers to the radial/focus error signal induced by the periodic disturbances of the recorder, $\omega_i=i\omega_0$ is the disc rotation frequency, $A_{1i}$ is the amplitude of the disturbances at said i:th harmonic of rotation frequency and $\theta_{1i}$ is the phase of the motor disturbance at said i:th harmonic of rotation frequency, and T is the sampling time and k is a real number; and taking the FFT transform of equation (1) in order to obtain the amplitudes $A_{1i}$ and the phases $\theta_{1i}$.

6. A system for correction of track related errors of an optical information carrier (14) during recording by a recorder, comprising an optical pick-up unit (30) controlled by a servo system (34) arranged to follow tracks prerecorded in said carrier, said system comprising:

a memory comprising information pertaining to periodic disturbances associated with the rotational speed of the drive mechanism or any harmonics thereof relating to the recorder, wherein said information comprises an amplitude and phase of a motor disturbance at an i:th harmonic of rotation frequency, where i =1 . . . N, ; and a repetitive control/learning feedforward track control circuit (88) of said servo system (34) to correct for such periodic disturbances during recording.

7. The system of claim 6, wherein said periodic disturbances relating to the recorder are turntable and spindle motor errors.

8. The system of claim 7, wherein said repetitive control/learning feedforward control circuit (88) suppresses only information pertaining to said periodic disturbances coming from turntable and spindle motor during recording.

9. The system of claim 8, further comprising:

a sensor for obtaining a rotation signal representative of a rotation speed of the information carrier (14);

a correction circuit (86) for calculation of suppressing information based on said rotation signal;

said repetitive control/learning control/learning feedforward control circuit (88) being arranged to calculate a suppressing signal to be added to a servo control signal for controlling said servo system (34) based on said suppressing information.

10. A method for correction of track related errors of an optical information carrier (14) during recording by a recorder, comprising an optical pick-up unit (30) controlled by a servo system (34) arranged to follow tracks prerecorded in said carrier, the method characterized in:

retrieving information pertaining to periodic disturbances associated with the rotational speed of a drive mechanism or any harmonics thereof relating to the recorder, from a memory of the recorder; and adding said amplitude and phase of a motor disturbance at an i:th harmonic of rotation frequency, to a repetitive control/learning feedforward control circuit (88) of said servo system (34) to correct for said periodic disturbances during recording wherein said information pertaining to periodic disturbances relating to the recorder is obtained by the following steps:

playing an information carrier (14) without carrier periodic disturbances;

obtaining a signal related to said periodic disturbances according to the following equation:

$$Y_1(k) = \sum_{i=1}^{N} A_{1i}\sin(\omega_i kT + \theta_{1i}) \quad (1)$$

where $Y_1$ refers to the radial/focus error signal induced by the periodic disturbances of the recorder, $\omega_i=i\omega_0$ is the disc rotation frequency, $A_{1i}$ is the amplitude of the disturbances at said i:th harmonic of rotation frequency and $\theta_{1i}$ is the phase of the motor disturbance at said i:th harmonic of rotation frequency, and T is the sampling time and k is a real number; and taking the FFT transform of equation (1) in order to obtain the amplitudes $A_{1i}$ and the phases $\theta_{1i}$.

11. The method of claim 10, wherein said periodic disturbances relating to the recorder are turntable and spindle motor errors.

12. The method of claim 11, further comprising:

suppressing only information pertaining to said periodic disturbances coming from turntable and spindle motor during recording by said repetitive control/learning feedforward control circuit (88).

13. The method of claim 12, further comprising:

obtaining a rotation signal representative of a rotation speed of the information carrier (14);

feeding said rotation signal to a correction circuit (86) for calculation of suppressing information;

feeding said suppressing information to said repetitive control/learning feedforward control circuit (88) to calculate a suppressing signal to be added to a servo control signal for controlling said servo system (34).

* * * * *